United States Patent Office 2,734,046
Patented Feb. 7, 1956

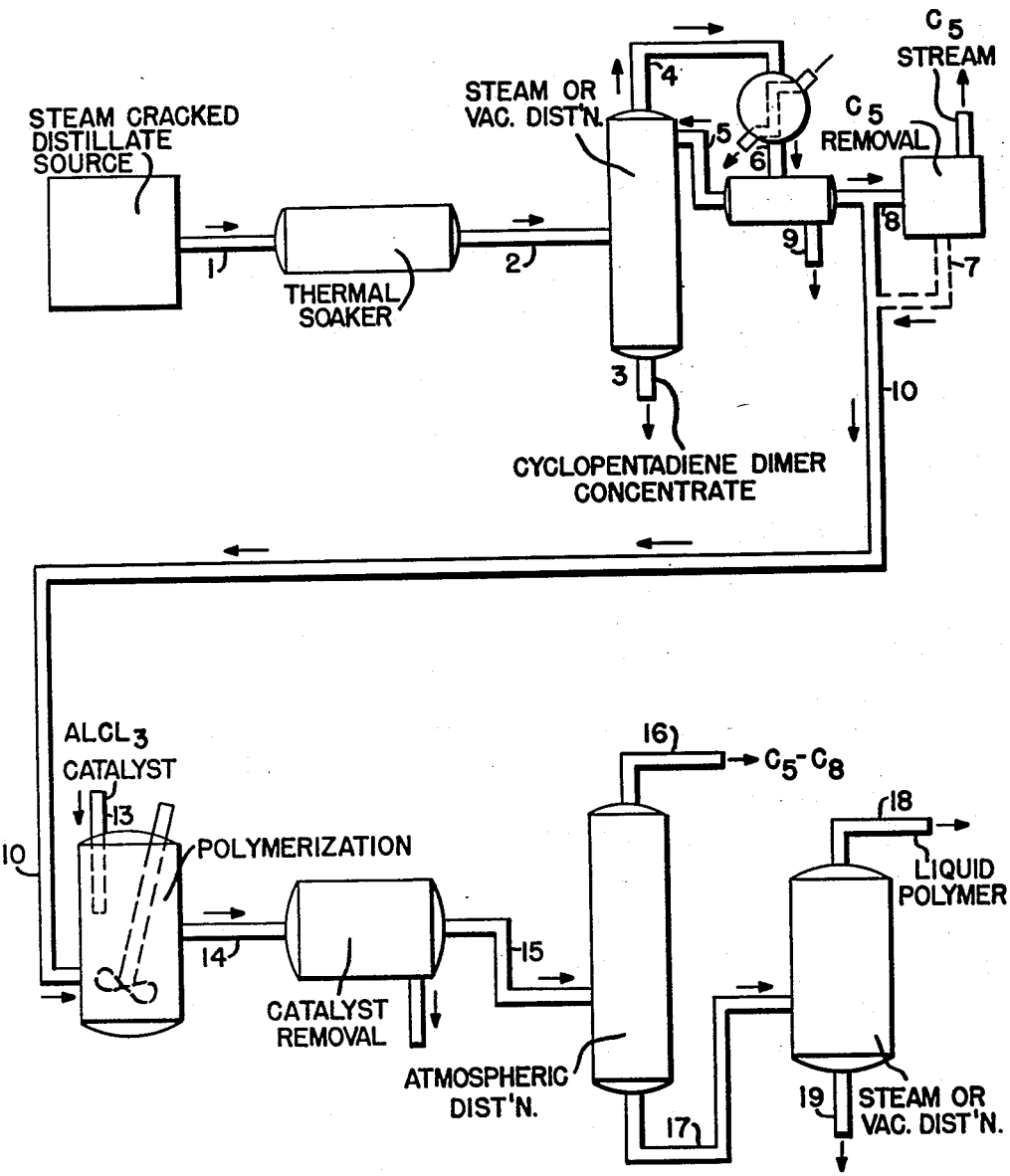

2,734,046

PROCESS FOR PREPARING PETROLEUM RESINS

Joseph F. Nelson, Rahway, Robert F. Leary, Cranford, and Fred W. Banes, Westfield, N. J., assignors to Esso Research and Engineering Company, a corporation of Delaware Application October 1, 1952, Serial No. 312,466

6 Claims. (Cl. 260—82)

This invention is concerned with the production of light colored resins from unsaturated petroleum fractions obtained by steam cracking and, more particularly, with the production of resins from a fraction substantially free of cyclic dienes by the use of an aluminum halide catalyst. The polymerization process also produces fractions having relatively high aromatic content from which chemically pure components can be recovered.

Although petroleum fractions from cracking operations have previously been used for preparing resins, the improved methods of this patent employ streams having controlled compositions and also use critical conditions of polymerization to give high quality, light colored resins, and at the same time, yield by-product streams which are free of sludge forming components but contain high concentrations of the desired aromatics.

The invention is of especial importance as a valuable process for the production of light colored resins from the highly unsaturated petroleum fractions produced by steam cracking of petroleum gas oil fractions or heavy naphthas. Preferably, the cyclic diolefins, such as cyclopentadiene and methylcyclopentadiene, are removed from a steam cracked fraction boiling largely below $C_9$. These cyclic diolefins are preferably removed by dimerization and distillation. The overhead so obtained, chiefly a $C_{5-7}$ fraction boiling below $C_8$ or $C_9$, is polymerized at an approximate temperature range of −40 to +70° C. with an aluminum halide catalyst, either as the solid, in a finely divided state, or as a slurry or in solution.

It is especially necessary that the resins produced be light colored and preferably, the resins have high softening points. Such resins are of particular usefulness in preparing floor tile formulations, and the like.

Briefly, the broad concept of the invention includes the following steps.

Petroleum fractions such as kerosene, gas oil, naphtha, etc. are cracked in the presence of steam at temperatures of about 1000° F. to 1500° F. to give highly unsaturated products. The liquid cut boiling largely below about $C_9$ is segregated and heated at about 90 to 140° C. to dimerize cyclopentadienes. Thereafter a $C_5$ to $C_9$ and lighter liquid cut including $C_8$ is taken overhead and there is separated a dimer concentrate as bottoms. The overhead stream, thus largely freed of cyclodienes, is the raw material for making superior resins. This stream is treated with an aluminum halide catalyst at about −40 to 70° C. under conditions of good agitation. The resin thus formed may be recovered by water and/or alkali washing to remove catalyst followed by stripping off the unpolymerized material. One good way to remove the halide catalyst is to add methyl alcohol to form a solid complex, which is then filtered off.

Superior light amber colored resins can be made in this way. These resins are well suited for making floor tile of the so-called asphalt type.

This invention pertains to a series of operations whereby the cracked distillate stream, boiling in the range of about 20° to 140° C., is treated to remove certain cyclic dienes, such as cyclopentadiene, and the like by thermal soaking followed by distillation. If desired, some portion of the $C_5$ fraction may be removed by distillation in a subsequent step although this is not necessary for the production of good resins. The unsaturated hydrocarbon mixture is polymerized with $AlCl_3$ or $AlBr_3$ and the resin is recovered from this polymerized reaction product. In general, from 0.25 up to 3.0% of the catalyst gives quite satisfactory results.

The table below shows the ranges of composition which can be used as feed material for these resins.

| Fractional distillation: | Weight percent |
|---|---|
| I. B. P.–38° C. | 0–30 |
| 38–70° C. | 25–50 |
| 70–130° C. | 75–15 |
| 130+°C. | 0–5 |
| Composition: | |
| Benzene | 15–30 |
| Toluene | 3–10 |
| $C_8$ Aromatics | <1 |
| Diolefins | 11–25 |
| Olefins | 70–29 |
| Paraffins | 0–5 |

The diolefin content of the mixture was obtained by reacting a mixture of 1.5 to 3.0 ml. of sample and 2.5 ml. of chloromaleic anhydride (diluted with 2 ml. benzene containing 0.1% tertiary butyl catechol) for 3 hours at 100° C., and steam distilling the resulting reaction mixture for 2 hours to recover HCl (1 mole/mole of diolefin).

The invention is described in more complete detail by the following examples and the accompanying figure, although it is not intended to limit the scope of the invention thereto.

EXAMPLE 1

A steam cracked distillate substantially all of which (95%) boiled between 25° and 135° C., was held for 7 hours at a temperature of 120° C. to dimerize substantially all cyclodienes. A cut (25° C.–95° C.) had the following weight percent composition:

| | Percent |
|---|---|
| Benzene | 24.3 |
| Diolefins | 20.8 |
| Paraffins | <5.0 |
| Olefins | Remainder |

This material (198 parts by weight) was then agitated at 20° C. while 5 parts of powdered $AlCl_3$ (30 mesh) was added over a period of 15 minutes. The agitation was continued for an additional 15 minutes, after which the reactor contents were washed with 5% NaOH and 3 times with water. After stripping at 7 mm. pressure to a 200° C. temperature at the bottom 73 parts of a light colored resin was obtained. This resin was a hard product at room temperature, and had a ring and ball softening point of 93.5° C. and an iodine number (Wijs) of 80.2.

EXAMPLE 2

To illustrate the invention in a schematic manner, the accompanying figure is presented. A steam cracked distillate boiling largely in the range of 25 to 130° C. is taken via line 1 to a thermal soaker wherein the cyclopentadienes are converted substantially completely to dimers. The thermal soaked product is taken by line 2 to the mid section of a distillation tower, operated under vacuum or with steam, to remove cyclodiene dimers as a concentrate stream 3 from the lower portion of the tower. The undimerized portion, $C_5$–$C_8$, is passed overhead as stream 4 to a receiver and reflux drum where part is returned to the upper part of the fractionator by lines 5 and 6 as reflux. A portion can be removed from the system, if desired, by line 9. The undimerized portion, $C_5$–$C_8$, is passed by lines 8 and 10 to a polymerization zone. If desired, a part or all of stream 8 can be by-passed to a $C_5$ removal zone and thereafter returned to the main stream by line 7 for polymerization. After addition of $AlCl_3$ catalyst by inlet 13, the stream is subjected to polymerization at approximately room temperature. The polymerized reaction mixture 14 is passed through a catalyst removal zone and thence as stream 15 to a distillation zone. From this distillation zone, a $C_5$–$C_8$ vapor stream 16 is removed and can be utilized for isolating aromatic components. A crude resin fraction 17 is passed to a distillation zone from which a liquid polymer stream 18 is removed overhead and the finished resin 19 is removed as bottoms product. The process may either be operated batchwise or in a continuous manner.

The resins produced as described above are amber colored products having softening points in the range of 70 to 105° C. and usually represent yields of 15 to 35% on the hydrocarbon feed. Examples of the preparation and properties of such resins are given in the examples and tables following.

EXAMPLE 3

The resins prepared with $AlCl_3$ catalysts have numerous points of superiority over those prepared with other Friedel-craft catalysts such as $BF_3$. These points are well illustrated by the data of the following examples.

The hydrocarbon feed is a mixture of overhead fractions from cyclopentadiene recovery units boiling from 20 to 135° C. Both solid $AlCl_3$ and gaseous $BF_3$ were employed as catalysts and the results in resin production were evaluated and compared. The $AlCl_3$ reactions were worked up by adding 2.5% methyl alcohol to the reaction mixture, followed by filtration. The $BF_3$ reactions were worked up by adding isopropyl alcohol to the reaction mixture, followed by water washing. The reaction conditions and data obtained on the products are shown in Table I.

These data illustrate the advantages of $AlCl_3$ catalysis to be (1) the production of a higher yield of a higher softening point resin, and (2) the production of resins having lower unsaturation. It is to be noted especially that only a small quantity of low boiling polymer product is produced with aluminum chloride whereas with $BF_3$ this intermediate boiling material amounted to about 10% based on the feed.

The light color of these resins is also particularly desirable. They are generally of light or medium amber color and have Gardner colors of 2 to 3. The resin color is determined by direct comparison of the color produced by a 2 weight per cent solution of resin in xylenes with the Gardner color index.

TABLE I

Comparison of polymerization catalysts

|  | $AlCl_3$ | $BF_3$ |
|---|---|---|
| Reaction Temperature, ° F. | 75–103 (24–39° C.) | 75–118 (24–48° C.) |
| Wt. Percent Catalyst on Hydrocarbon Feed. | 1.25–1.3 | 0.81. |
| Reaction Time, Min. | 50 | 49. |

PRODUCT RECOVERED AS RESIDUE FROM STRIPPING TO A BOTTOMS TEMP. OF 450° F. ATM. PRESSURE

| Yield, Wt. Percent on Hydrocarbon Feed. | 26 | 22.7. |
|---|---|---|
| Visc. SSU @ 210° F. | Solid | 137. |
| Color, Gardner (diluted) | 4 | 3. |
| Grav., ° API @ 60° F. | 15.6 | 20.1. |
| Non-Volatile: |  |  |
| 3 Hrs. | 94.2 | 85.2. |
| 24 Hrs. | 89.9 | 77.6. |
| Ash, Percent | 0.017 | 0.01. |

PRODUCT RECOVERED AS RESIDUE FROM STRIPPING TO A BOTTOMS TEMP. OF 500° F. @ 2 MM. Hg

| Yield, Wt. Percent on Hydrocarbon Feed. | 22.5 | 13.9. |
|---|---|---|
| Wt. Percent Liquid Polymer on Feed. | 3.5 | 8.8. |
| Iodine No.[1] | 120 | 148. |
| Softening Point, ° C. | 75 | 26–30. |

PRODUCT RECOVERED AS RESIDUE AFTER STRIPPING TO A BOTTOMS TEMP. OF 500° F. WITH HIGH PRESSURE STEAM

| Hours Stripping @ 500° F. | 7 | 23. |
|---|---|---|
| Yield, Wt. Percent on Hydrocarbon Feed. | 18 | 8. |
| Resin Softening Point, ° C. | 93 | 93. |
| Resin Color | Light Amber | Light Amber. |

[1] Wijs Iodine No. (5 ml. of 0.2 N Wijs reagent per 0.04–0.055 g. of sample).

EXAMPLE 4

Another advantage of $AlCl_3$ catalyzed polymerizations over $BF_3$ catalyzed polymerizations lies in the fact that the former systems show less corrosivity in carbon steel equipment. This is illustrated by comparison of data given in Table II below. In obtaining these data, 1" x 2" strips of polished carbon steel sheeting, 1/16" thickness, were placed in the reactor along with the hydrocarbon charge. The indicated catalyst was added to effect polymerization. After completion of catalyst addition, the reaction mixture was held at 120° F. for 48 hours after which the steel plates were removed, washed thoroughly and weighed. The data indicate that in systems containing varying amounts of water, the corrosivity of the $BF_3$ systems was severe whereas no corrosion occurred in the $AlCl_3$ systems.

TABLE II

Corrosion of carbon steel in polymerization systems

| Temp. (° F.) | Time (Hrs.) | Catalyst ||||| 
|---|---|---|---|---|---|---|
| | | 0.75% $BF_3$ ||| 1.0% $AlCl_3$ ||
| | | Percent $H_2O$ in Hydrocarbon Feed | Wt. Change of 1" x 2" x 1/16" Carbon Steel Strip (gms.) | Corrosion Change (lb./sq. ft./yr.) | Wt. Change of 1" x 2" x 1/16" Carbon Steel Strip (gms.) | Corrosion Change (lb./sq. ft./yr.) |
| 120 | 48 | 0.057 | −0.0175 | −0.232 | +.0006 | +.008 |
| 120 | 48 | 0.103 | −0.0283 | −0.376 | +.0004 | +.005 |

EXAMPLE 5

A series of experiments was carried out to determine the effect of polymerization reaction temperature. The details of these experiments are shown in Table III. These data show that, over the entire range of temperature from −40 up to 60° C., substantially the same good results were obtained with regard to resin yield, softening point, iodine number values, intrinsic viscosity and Gardner color.

TABLE III

*Effect of polymerization temperature*

| Feed Naphtha [1] | 1 | | | 2 | | | |
|---|---|---|---|---|---|---|---|
| Catalyst | 1% of 30 mesh AlCl₃ Powder | | | | | | |
| Reaction Temp., °C | 20 | 35 | 50 | −40 | 0 | 45 | 60 |
| Catalyst Removal | CH₃OH Precipitation and Filtration | | | Water and Caustic Washing | | | |
| Resin Yield, Wt. Percent on Feed [2] | 29.6 | 26.6 | 26.5 | 18 | 29.8 | 32.5 | 30.9 |
| Resin Properties: | | | | | | | |
| Soft. Pt., °C | 92 | 82 | 80 | 89 | 90 | 90 | 91 |
| Iodine No.[3] | 116 | 92 | 105 | 104–110 | 104–110 | 104–110 | 104–110 |
| Intrinsic Viscosity | 0.042 | | 0.037 | | | | |
| Color | Light amber | | | 2 | 3 | 2 | 3 |

| [1] Naphtha | 1 | 2 |
|---|---|---|
| Composition, Wt. Percent: | | |
| Benzene | 20 | 19.6 |
| Toluene | 9 | 4.2 |
| C₈ Aromatics | <1 | <1 |
| Paraffins | 1 | 1 |
| Diolefins | 14.5 | 15 |
| Olefins | 65.5 | 60.2 |
| Distillation, Wt. Percent overhead: | | |
| I. B. P.–38° C | 17 | 3.9 |
| 38–70° C | 22 | 39.9 |
| 70–130° C | 59 | 52.7 |
| >130° C | 2 | 3.5 |

[2] Stripped to a bottoms temperature of 260–270° C. at 2–5 mm. Hg.
[3] 5 ml. of 0.2 N Wijs Reagent per 0.04–0.055 g. resin.

EXAMPLE 6

Experiments were carried out to study the effect of type and concentration of catalyst on the quality of resin produced. The details of these experiments are shown in Table IV. It was found that AlBr₃ dissolved in n-hexane, solid AlCl₃ including powdered AlCl₃, an ethyl chloride solution of AlCl₃, and an n-hexane slurry of AlCl₃ can be used quite satisfactorily to give high quality resins. Variations in catalyst concentrations of from 0.75% up to 2.0% based on the hydrocarbon feed can be employed.

EXAMPLE 7

A number of different methods for catalyst removal were also tested to determine the effect of this variable on the properties of the resin produced. The details of this study are shown in Table V. In general, the particular method used for recovering resin was found not to be of great consequence with regard to resin quality. Methods tested included the precipitation of the AlCl₃ by methyl alcohol followed by filtration, and alcohol, caustic or water washing.

TABLE IV

*Effect of catalyst type and concentration*

| Feed Naphtha [1] | 1 | | | | | | | 3 | |
|---|---|---|---|---|---|---|---|---|---|
| Catalyst | AlBr₃ | AlCl₃ | AlCl₃ | AlCl₃ | AlCl₃ | AlCl₃ | AlCl₃ | AlCl₃ | |
| Wt. Percent on Hydrocarbon Feed | 1.0 | 0.75 | 1.0 | 2.0 | 0.53 | 1.1 | 1.0 | 1.0 | |
| Method of Cat. Addn | Soln. in n-Hexane | Solid | Solid | Solid | C₂H₅Cl Solution | | n-Hexane Slurry (10%) | Solid Powder | |
| Reaction Temp., °C | 20 | 20 | 20 | 20 | 20 | 20 | 38 | 35 | |
| Catalyst | CH₃OH Precipitation & Filtration | | | | | | Hot Water Washing | | |
| Resin Yield [2] | 20.8 | 28.2 | 29.6 | 35.2 | 22.8 | 26.0 | 25.5 | 29.4 | |
| Resin Properties: | | | | | | | | | |
| Soft. Pt., °C | 110 | 85 | 92 | 83 | 83 | 82 | 86 | 89 | |
| Iodine No.[3] | 119 | 109 | 116 | 103 | 103 | 101 | | | |
| Intrinsic Viscosity | | 0.037 | 0.042 | 0.047 | | 0.031 | | | |
| Color | Light to medium amber | | | | | | | | |

| [1] Naphtha | 1 | 3 |
|---|---|---|
| Composition, wt. percent: | | |
| Benzene | 20 | 29.1 |
| Toluene | 9 | 6.8 |
| C₈ aromatics | <1 | <1 |
| Paraffins | 1 | 1 |
| Diolefins | 14.5 | 14 |
| Olefins | 65.5 | 49.1 |
| Distillation, wt. percent overhead: | | |
| I. B. P.–38° C | 17 | 8 |
| 38–70° C | 22 | 25 |
| 70–130° C | 59 | 64 |
| >130° C | 2 | 3 |

[2] Stripped to a bottoms temperature of 260–270° C. at 2–5 mm. Hg.
[3] 5 ml. of 0.2 N Wijs Reagent per 0.04–0.055 g. resin.

TABLE V

Effect of catalyst recovery method

| Feed Naphtha [1] | 1 | | | | | 3 | |
|---|---|---|---|---|---|---|---|
| Catalyst | AlCl₃ | AlCl₃ | AlCl₃ | AlCl₃ | AlCl₃ | AlCl₃ | AlCl₃. |
| Wt. percent on Hydrocarbon Feed | 1.0 | 1.0 | 1.0 | 1.0 | 1.0 | 1.0 | 1.0. |
| Method of Cat. Addn | Solid | Solid | Solid | Solid | Solid | n-Hexane Slurry (10%) | Solid Powder. |
| Reaction Temp., °C | 35 | 50 | 20 | 20 | 20 | 38 | 35. |
| Catalyst Removal | CH₃OH Pptn. and Filtration | CH₃OH Washing | Water Washing | Caustic Washing | Hot Water Washing | | |
| Resin Yield [2] | 21.6 | 21.5 | 25.5 | 29.7 | 26.2 | 25.5 | 29.4. |
| Resin Properties: | | | | | | | |
| Soft. Pt., °C | 82 | 80 | 89 | 87 | 86 | 86 | 89. |
| Iodine No.[3] | | 105 | | | | | |
| Int. Viscosity | | 0.037 | 0.056 | | 0.120 | | |
| Color | | | | Light to medium amber | | | |

| [1] Naphtha | 1 | 3 |
|---|---|---|
| Composition, wt. percent: | | |
| Benzene | 20 | 29.1 |
| Toluene | 9 | 6.8 |
| C₈ Aromatics | <1 | <1 |
| Paraffins | 1 | 1 |
| Diolefins | 14.5 | 14 |
| Olefins | 65.5 | 49.1 |
| Distillation, wt. percent overhead: | | |
| I. B. P.–38° C | 17 | 8 |
| 38–70° C | 22 | 25 |
| 70–130° C | 59 | 64 |
| >130° C | 2 | 3 |

[2] Stripped to a bottoms temperature of 260–270° C. at 2–5 mm. Hg.
[3] 5 ml. of 0.2 N Wijs Reagent per 0.04–0.055 g. resin.

What is claimed is:

1. In a process for the preparation of improved petroleum resins the combination which comprises isolating a steamed cracked hydrocarbon petroleum fraction boiling between about more than 20° C. to less than 140° C., said fraction being substantially below $C_9$, heating the steam cracked fraction to a temperature sufficient to dimerize substantially all cyclodienes, stripping the resulting admixture to a temperature sufficient to separate an overhead product from the dimerized cyclodienes, recovering as the overhead product a stream boiling between about more than 20° C. to less than 140° C. and having the following composition:

| | Weight percent |
|---|---|
| Benzene | 15–30 |
| Toluene | 3–10 |
| C₈ aromatics | <1 |
| Diolefins | 11–25 |
| Olefins | 70–29 |
| Paraffins | 0– 5 | said composition being substantially free of cyclodienes, and polymerizing the stream in the presence of an aluminum halide catalyst at a temperature of about —40° C. to +70° C. and recovering the resin formed thereby.

2. In a process for the preparation of improved petroleum resins, the combination which comprises isolating a steam cracked petroleum fraction boiling between about 20° C. and 140° C., said fraction being substantially below $C_9$, heating the fraction to a temperature of about 90° C.–140° C., whereby to dimerize substantially all the cyclodienes, stripping the resulting admixture to a temperature of not more than 450° F. but sufficient to separate an overhead product from the cyclodienes, recovering as the overhead product a stream boiling between about more than 20° C. to less than 140° C. and having the following composition:

| | Weight percent |
|---|---|
| Benzene | 15–30 |
| Toluene | 3–10 |
| C₈ aromatics | <1 |
| Diolefins | 11–25 |
| Olefins | 70–29 |
| Paraffins | 0– 5 | said stream being substantially free from cyclodienes, and polymerizing the stream in the presence of an aluminum chloride catalyst at a temperature between about —40° C. to +70° C. and recovering the resin formed thereby.

3. In a process for the preparation of a petroleum resin, the improvement which comprises isolating a steam-cracked petroleum fraction boiling between about 20° to 140° C., heating the fraction to a temperature sufficient to dimerize substantially all cyclodienes, removing the dimerized cyclodienes to leave a mixture comprising about 11 to 25 weight percent diolefins, said mixture having the following distillation analysis:

| | Weight percent |
|---|---|
| I. B. P. to 38° C | 0–30 |
| 38–70° C | 25–50 |
| 70–130° C | 75–15 |
| 130–140° C | 0– 5 | polymerizing said substantially cyclodiene-free mixture in the presence of an aluminum halide catalyst at a temperature of about —40° C. to +70° C., and recovering the resin formed thereby.

4. Process according to claim 3 in which the catalyst is aluminum chloride.

5. Process according to claim 3 in which the catalyst is aluminum bromide.

6. Process according to claim 3 in which the analysis of the cyclodiene-free mixture is:

| | Weight percent |
|---|---|
| Benzene | 15–30 |
| Toluene | 3–10 |
| C₈ aromatics | <1 |
| Diolefins | 11–25 |
| Olefins | 70–29 |
| Paraffins | 0– 5 |

References Cited in the file of this patent

UNITED STATES PATENTS

| | | |
|---|---|---|
| 1,982,708 | Thomas et al. | Dec. 4, 1934 |
| 2,039,363 | Thomas | May 5, 1936 |
| 2,521,022 | Rowland | Sept. 5, 1950 |